(12) United States Patent
Mizuno et al.

(10) Patent No.: US 8,808,936 B2
(45) Date of Patent: Aug. 19, 2014

(54) FUEL CELL SYSTEM AND METHOD FOR CONTROLLING ELECTRIC CURRENT OF SAME

(75) Inventors: Tamaki Mizuno, Yokohama (JP); Takeshi Ibuka, Yokohama (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 0 days.

(21) Appl. No.: 13/609,715

(22) Filed: Sep. 11, 2012

(65) Prior Publication Data

US 2013/0004870 A1    Jan. 3, 2013

Related U.S. Application Data

(63) Continuation of application No. PCT/JP2011/055375, filed on Mar. 8, 2011.

(30) Foreign Application Priority Data

Mar. 11, 2010   (JP) ................................ 2010-053936

(51) Int. Cl.
*H01M 8/04*     (2006.01)
(52) U.S. Cl.
USPC ............................ 429/431; 429/428; 429/430
(58) Field of Classification Search
USPC ............. 429/408–427, 429–451, 535, 50, 61, 429/121; 307/66–67
See application file for complete search history.

(56) References Cited

U.S. PATENT DOCUMENTS

| | | | |
|---|---|---|---|
| 2005/0053814 A1 | 3/2005 | Imamura et al. | |
| 2010/0266875 A1* | 10/2010 | Somogye et al. | ............... 429/7 |
| 2010/0273075 A1 | 10/2010 | Imanishi et al. | |

FOREIGN PATENT DOCUMENTS

| | | | |
|---|---|---|---|
| JP | 2004-199895 | 7/2004 | |
| JP | 2005-141939 | 6/2005 | |
| JP | 2006-309979 | 11/2006 | |
| JP | 2009-158399 | 7/2009 | |
| WO | WO2008063461 | * 5/2008 | ............... G05F 1/10 |

OTHER PUBLICATIONS

International Preliminary Report on Patentability (Chapter I of the Patent Cooperation Treat), mailed Sep. 20, 2012, PCT/JP2011/055375, pp. 1-10.

* cited by examiner

*Primary Examiner* — Basia Ridley
*Assistant Examiner* — Caitlin Wilmot
(74) *Attorney, Agent, or Firm* — Finnegan, Henderson, Farabow, Garrett & Dunner LLP

(57) ABSTRACT

In a fuel cell system, when an electric current drawn from fuel cells is controlled based on a target power generation value, an upper limit of the electric current is optimally set to make suspensions of operation caused by voltage drops to be as infrequent as possible. The upper limit of the electric current is set by adding a predetermined offset value (e.g., 2 A) to an average value of the electric current before a predetermined delay time (e.g., 10 seconds). Moreover, when the electric current drawn from the fuel cells is controlled based on a target power generation value, the value of the electric current is compared with the upper limit of the electric current, to control the electric current.

4 Claims, 7 Drawing Sheets

FUEL CELL SYSTEM AND METHOD FOR CONTROLLING ELECTRIC CURRENT OF SAME

This application is a continuation of PCT/JP2011/055375, filed on Mar. 8, 2011.

BACKGROUND OF THE INVENTION

1. Field of the Invention

The present invention relates to a fuel cell system, and in particular, relates to a technique of controlling an electric current drawn from fuel cells.

2. Description of Related Art

A household fuel cell system (power generating unit) generally includes a hydrogen production device including a reformer which reforms a hydrocarbon fuel (e.g., municipal gas, LPG, or kerosene) to produce hydrogen; fuel cells (a fuel cell stack) which generates direct current power by an electrochemical reaction between the produced hydrogen and oxygen in air; a power conditioner which draws the direct current power generated by the fuel cells and converts the power to alternating current power to thereby supply the converted power to domestic appliances; and a heat exchanger which collects heat generated by the fuel cells or the like, and exchanges the heat with a hot-water supply unit side.

For such a fuel cell system, there is known a method in which a target power generation value is set in accordance with demand power, and based on the set value, a fuel supply and the like are adjusted to thereby control the power generation. On the other hand, based on the desired power generation value, an electric current drawn from fuel cells is controlled, and the electric current drawn from the fuel cells is compared with an upper limit of the electric current and then the electric current is limited.

Furthermore, in Japanese Laid-Open Patent Publication No. 2006-309979, if an output voltage of fuel cells is lower than a lower limit of a voltage at which the fuel cells can stably generate power, the electric current drawn from the fuel cells is limited.

In a conventional fuel cell system, an electric current drawn from fuel cells is controlled based on a target power generation value. However, if the target power generation value suddenly increases and then the electric current drawn from the fuel cells suddenly increases, an output voltage of the fuel cell suddenly decreases in accordance with I-V characteristics, and the output voltage is lower than a lower limit of a voltage at which the fuel cells can stably generate power, leading to the suspension of an operation occasionally.

Therefore, the electric current drawn from the fuel cells is limited by setting an upper limit of the electric current, but conventionally, the upper limit of the electric current is set in accordance with the target power generation value, and when the electric current is momentarily close to the upper limit of the electric current, a voltage drops in excess of the lower limit of the voltage, failing to prevent the suspension of the operation.

Furthermore, in Japanese Laid-Open Patent Publication No. 2006-309979, if the output voltage of the fuel cells is lower than the lower limit of the voltage at which the fuel cells can stably generate the power, the electric current drawn from the fuel cell is limited. However, this control is carried out after the occurrence of the voltage drop of the fuel cells, and hence there is a problem that the voltage drop is not able to be prevented in advance.

In view of such circumstances, it is an object of the present invention to optimally set an upper limit of an electric current drawn from fuel cells, thereby decreasing the suspension of the operation caused by voltage drop as less frequently as possible.

SUMMARY OF THE INVENTION

In order to solve the above-described problem, an aspect of the present invention provides a fuel cell system including electric current control means for controlling an electric current drawn from fuel cells based on a target power generation value; and electric current limiting means for limiting the electric current by comparing the electric current with an upper limit of the electric current to the system further including electric current upper limit setting means for setting the upper limit of the electric current by adding a predetermined offset value to an average value of the electric current before a predetermined delay time.

According to an aspect of the present invention, an upper limit of an electric current is set by adding a predetermined offset value to an average value of the electric current before a predetermined delay time, whereby with respect to a comparatively gradual change of a target power generation value, unnecessary suppression of the electric current is not performed, but with respect to a rapid change of the target power generation value, the upper limit of the electric current is immediately updated to an optimal value. Therefore, a voltage drop caused by rapid rise of the electric current can be prevented, and the suspension of an operation caused by the voltage drop can be decreased as less frequently as possible.

DESCRIPTION OF THE PREFERRED EMBODIMENTS

Hereinafter, an embodiment of the present invention will be described in detail.

Figure 1:
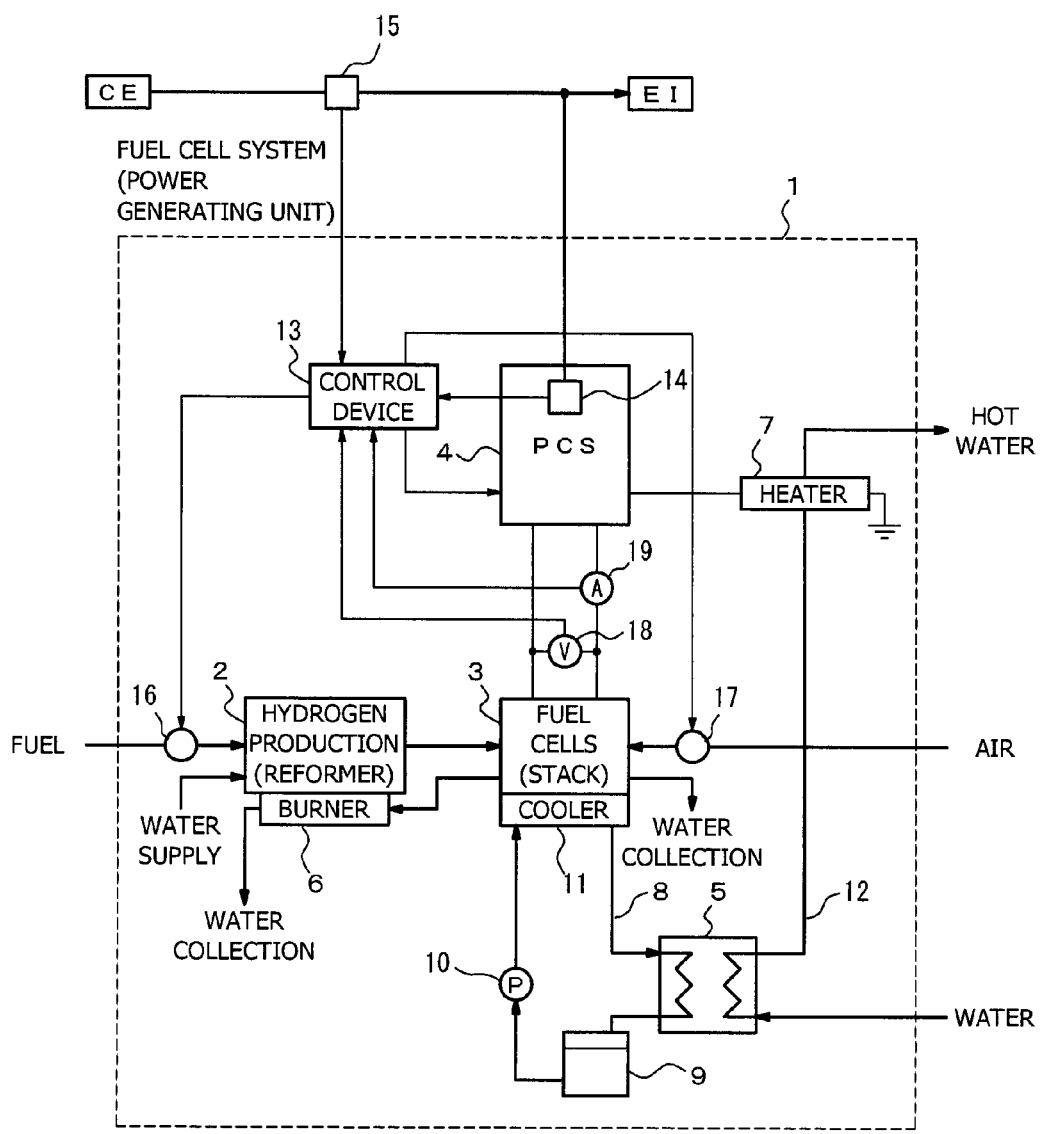
FIG. 1 is a schematic constitutional view of a fuel cell system showing an embodiment of the present invention.

FIG. 1 is a schematic constitutional view of a fuel cell system (a power generating unit) showing the embodiment of the present invention. The household fuel cell system (the power generating unit) includes, in a system housing 1, a hydrogen production device 2, fuel cells 3, a power conditioner (PCS) 4, and a heat exchanger 5.

The hydrogen production device 2 includes, as a main body, a reformer which reforms a hydrocarbon fuel (e.g., municipal gas, LPG, or kerosene) by use of a reforming catalyst while supplying water vapor, to produce hydrogen (the hydrogen-rich fuel gas including $H_2$ and $CO_2$). Moreover, the device includes a burner 6 for heating the reformer by a reforming reaction (endothermic reaction), and in the burner 6, an off-gas on a fuel-pole side of the fuel cells 3 (the fuel before reformed prior to the generation of the off-gas) is burnt.

Although not shown, the hydrogen production device 2 additionally includes a desulfurizer which is disposed on an upstream side of the reformer and in which a sulfur compound included in the hydrocarbon fuel before reformed is adsorbed and removed by use of an adsorbent, or converted and removed by use of a desulfurization catalyst; and a CO shift reactor which is disposed on a downstream side of the reformer and in which by-product CO in the reformed gas is reacted with residual water vapor by a shift catalyst and converted to $CO_2$ and $H_2$.

Moreover, if necessary, the device may further include a CO selective oxidation unit in which CO slightly remaining in the gas after the shift reaction is selectively oxidized by use of a selective oxidation catalyst while supplying air, and converted to $CO_2$.

The fuel cells 3 is a fuel cell stack of, for example, a polymer electrolyte type (PEFC), and has a constitution in which a plurality of fuel cells are stacked. Each of the fuel cells includes a fuel pole (anode), an air pole (cathode), and an electrolytic layer (the polymer ion exchange film) interposed between these poles. Therefore, the fuel cells 3 generates direct current power by an electrochemical reaction (exothermic reaction) between hydrogen and oxygen, when hydrogen (the hydrogen-rich fuel gas) is supplied to the fuel pole on one end side of the electrolytic layer and oxygen in the air is supplied to the air pole on the other end side of the electrolytic layer. It is to be noted that the fuel cells 3 are not restricted to the polymer electrolyte type (PEFC), and may be fuel cells of another type such as a phosphoric acid type (PAFC), a molten carbonate type (MCFC), a solid oxide type (SOFC) or an alkali electrolyte type (AFC).

The power conditioner (PCS) 4 draws the direct current power generated by the fuel cells 3, and also includes an inverter to convert the direct current power to alternating current power, thereby supplying the power to domestic appliances (loads) EI. Moreover, the power conditioner 4 is provided with a surplus power heater 7. When the generated power of the fuel cells 3 is in excess of demanded power of the appliances EI, for the purpose of preventing a reverse power flow, part of the direct current power before being converted by the inverter or the converted alternating current power is supplied to the surplus power heater 7, to consume the surplus power. Additionally, when the generated power of the fuel cells 3 is less than the demanded power of the appliances EI, auxiliary power from a commercial power system CE is supplied to the appliances EI.

The heat exchanger 5 constitutes, on a primary side thereof, part of a cooling water circulation passage 8 for cooling the fuel cells 3, and constitutes, on a secondary side thereof, part of a heat collection passage 12 on a hot-water supply unit (hot-water storage unit) side, and the heat exchanger collects heat generated by the fuel cells 3, and exchanges the heat with the hot-water supply unit.

In the cooling water circulation passage 8 on the primary side of the heat exchanger 5, water in a water tank 9 is fed to a cooler 11 of the fuel cells 3 by a water pump 10, and the water having a temperature raised here flows on the primary side of the heat exchanger 5, exchanges the heat with the water from the hot-water supply unit, and is then returned into the water tank 9. Although not shown, this cooling water is also used in the cooling of the exothermic reaction in the CO shift reactor and the CO selective oxidation unit of the hydrogen production device 2.

Moreover, in the heat collection passage 12 on the secondary side of the heat exchanger 5, the surplus power heater 7 is disposed to collect the heat during the consuming of the surplus power. Water required for the reforming is supplied to the hydrogen production device (the reformer) 2.

The fuel cell system (the power generating unit) also includes a control device 13 which controls the power generated by the fuel cells 3 in accordance with the demanded power of the appliances EI. The control device 13 is constituted of a microcomputer, and includes a CPU, an ROM, an RAM, an input and output interface, and the like.

For the control in accordance with the demanded power of the appliances EI, signals are input into the control device 13 from meters 14 and 15. The meter 14 measures supply power to be supplied from the fuel cells 3 to the appliances EI, and outputs the measured value of the supply power to the control device 13. The meter 15 measures the auxiliary power to be supplied from the commercial power system CE to the appliances EI, and outputs the measured value of the auxiliary power to the control device 13. The demanded power of the appliances EI is calculated as a sum of the supply power and the auxiliary power.

The control of the generated power by the control device 13 is carried out by controlling an amount of the fuel to be supplied to the hydrogen production device 2 through fuel supply control means (a pump and/or a control valve) 16 to control an amount of the reformed fuel to be supplied to the fuel cells 3, and controlling an amount of the air to be supplied to the fuel cells 3 through air supply control means (a pump and/or a control valve) 17. In actuality, additionally, there is carried out cooperative control of the supply of reforming water to the hydrogen production device (reformer) 2, the supply of the fuel to the burner 6, the supply of the air to the CO selective oxidation unit, the supply of the cooling water to each part, and the like.

Therefore, the control device 13 sets a target power generation value of the fuel cells 3 in accordance with the demanded power of the appliances EI, and accordingly (so as to obtain the target power generation value) controls the fuel supply amount, the air supply amount and the like, to control the power generation of the fuel cells 3.

The control device 13 also controls the power conditioner 4. Specifically, the control device 13 sets and controls the electric current drawn from the fuel cells 3 based on the target power generation value of the fuel cells 3. More specifically, the control device 13 divides the target power generation value of the fuel cells 3 by an output voltage (an instantaneous value) of the fuel cells 3, to set a target electric current value, and controls the electric current drawn from the fuel cells 3 in accordance with this target electric current value.

Additionally, the fuel cells 3 are provided with a fuel cell voltmeter 18 which measures the output voltage of the fuel cells 3, and a fuel cell ammeter 19 which measures an output current of the fuel cells 3, and these signals are input into the control device 13.

Furthermore, when the generated power of the fuel cells 3 is in excess of the demanded power of the appliances EI, the control device 13 lowers the power generation value of the fuel cells 3, but controls the power conditioner 4 to supply the surplus power generated during the drop of actual power to surplus power heater 7 and convert the power to heat energy for use in hot-water supply.

Next, the electric current control of the control device 13 according to an embodiment of the present invention to set and control the electric current drawn from the fuel cells 3 through the power conditioner 4, will be described in more detail.

Figure 2:
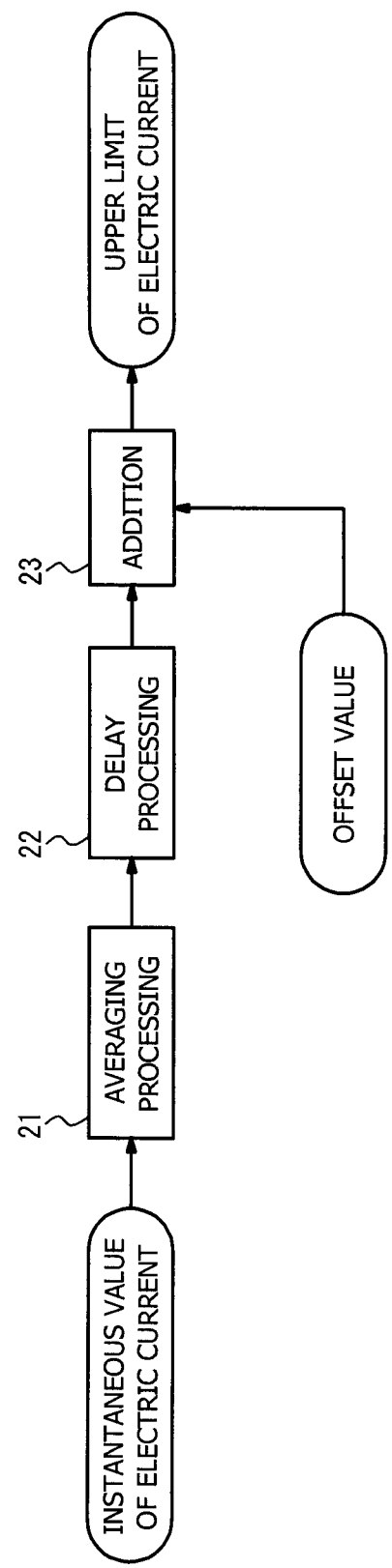
FIG. 2 is a block diagram of setting of an upper limit of an electric current.

FIG. 2 is a block diagram of setting of an upper limit of the electric current.

In an averaging processor 21, the instantaneous values of the electric current measured by the ammeter 19 (FIG. 1) are averaged (smoothed). Specifically, an ammeter output (the instantaneous value of the electric current) is sampled every predetermined time interval (e.g., 0.5 second), and an average value of the electric current of four points, i.e., the present time point, 0.5 seconds before, 1.0 second before, and 1.5 seconds before is obtained.

Figure 3A:
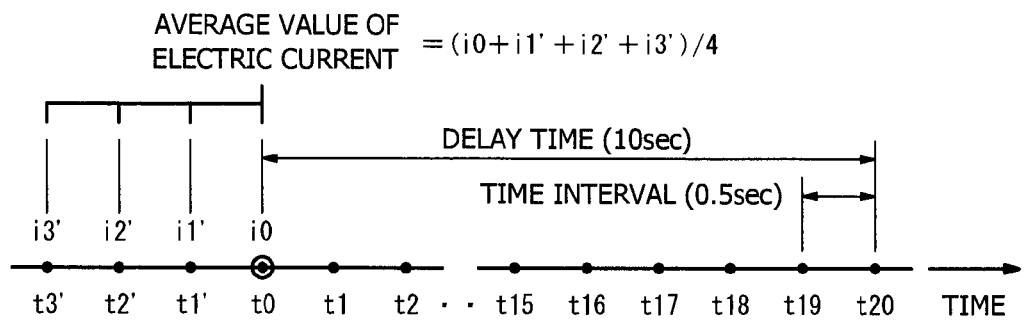
FIGS. 3A and 3B are explanatory views of the setting of the upper limit of the electric current.

That is, referring to FIG. 3A, at time point t0, the average value of a current value i0 of the time point t0, a current value i1' of a time point t1', a current value i2' of a time point t2' and a current value i3' of a time point t3' is obtained (see the following equation).

$$\text{Electric current average value} = (i0 + i1' + i2' + i3')/4$$

A delay processor 22 delays an output of the average value of the electric current which is obtained by the averaging processor 21 to a subsequent stage as much as a predetermined delay time (e.g., 10 seconds). In other words, the average value of the electric current before the predetermined delay time (e.g., 10 seconds) is output to the subsequent stage (an adder 23).

That is, referring to FIG. 3A, at a time point t20 of 10 seconds after the time point t0, the average value of the electric current obtained at the time point t0 is output.

Figure 3B:
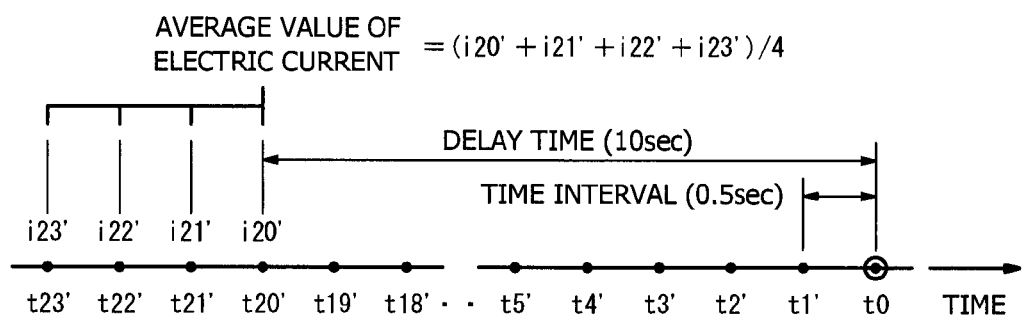

In other words, referring to FIG. 3B, at the time point t0, the average value of the electric current of four points of time points t20', t21', t22' and t23' before the predetermined delay time (10 seconds) is output (see the following equation).

$$\text{Electric current average value} = (i20' + i21' + i22' + i23')/4$$

The adder 23 adds a predetermined offset value (e.g., 2 A) to the average value of the electric current before the predetermined delay time from the delay processor 22. This is the upper limit of the electric current.

Figure 4:
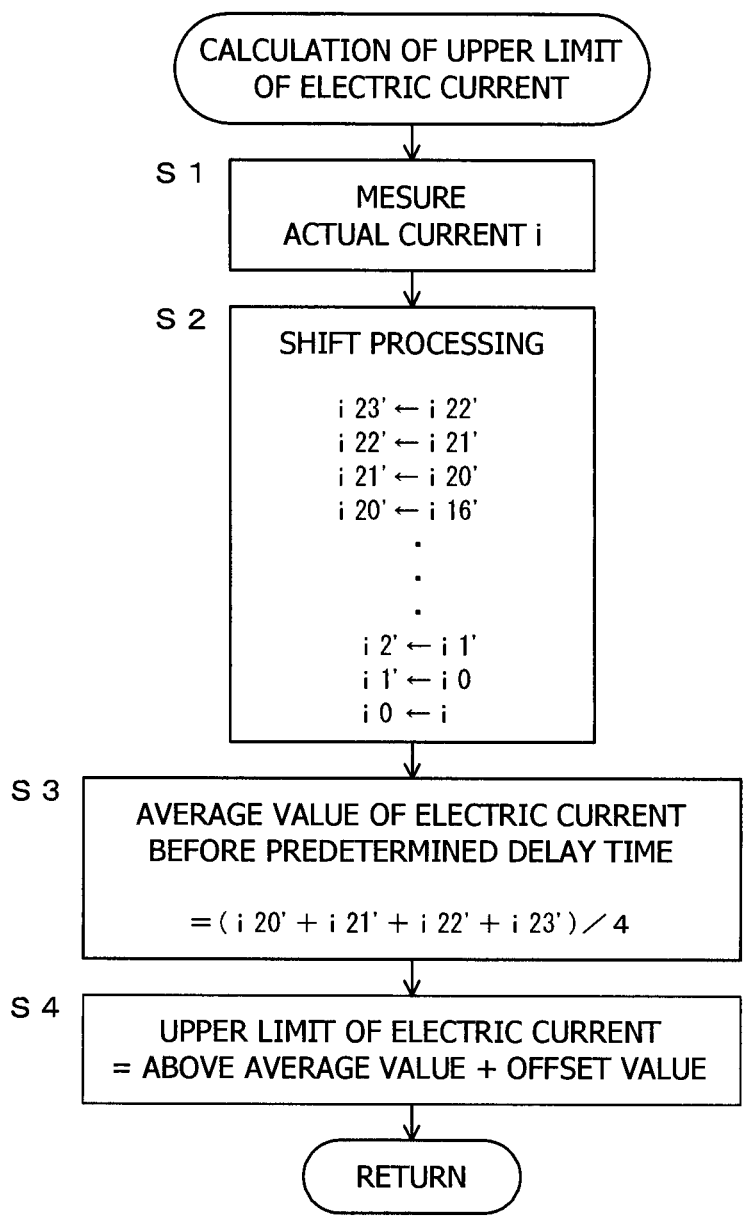
FIG. 4 is a flowchart of an electric current upper limit setting routine.

FIG. 4 is a flowchart of calculation of the upper limit of the electric current based on the above. The present flow is executed every predetermined time interval (0.5 second).

In S1, an actual current (the instantaneous value of the electric current) i is measured.

In S2, as to the value of the electric current, a stored value of a shift register (i0 to i23'), which stores electric current data of 24 points in total from the present time point to 21.5 seconds before every 0.5 seconds, is shift-processed. That is, the data at i22' of 21.0 seconds before is written at i23' to store the electric current data of 21.5 seconds before, and then the shift processing is successively performed, to write data of presently measured actual current i at i0 to store the latest electric current data.

In S3, data pieces of the four points i20', i21', i22' and i23' before the predetermined delay time (10 seconds) are read, and an average value of these four time points is calculated, to obtain the average value of the electric current before the predetermined delay time.

In S4, the predetermined offset value (e.g., 2 A) is added to the average value of the electric current before the predetermined delay time which is obtained in S3, to obtain the upper limit of the electric current.

Figure 5:
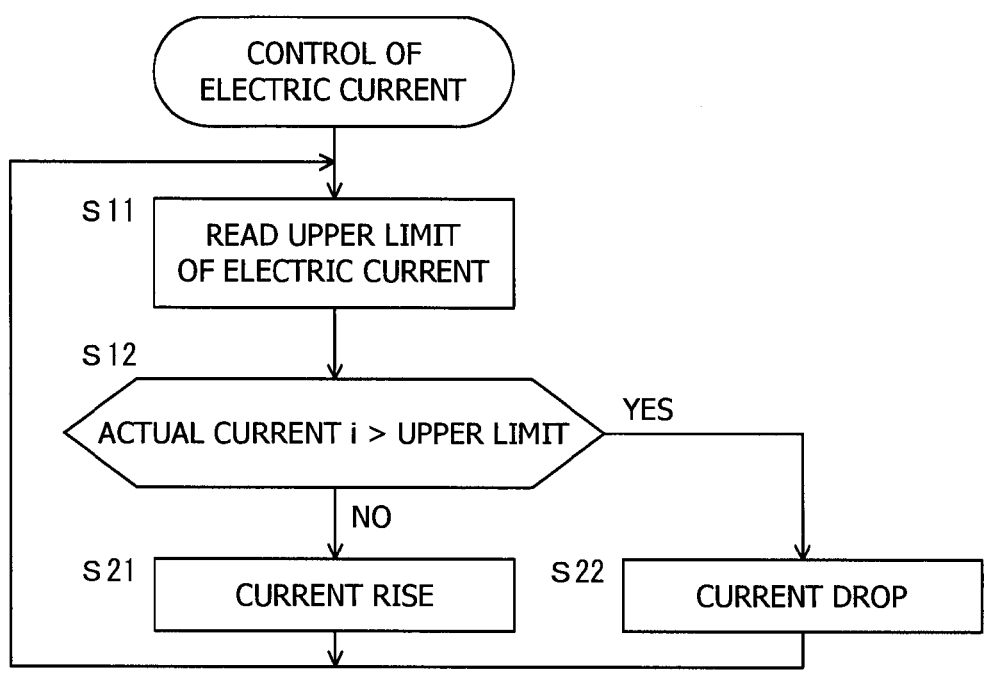
FIG. 5 is a flowchart of a basic example of an electric current control routine.

FIG. 5 is a flowchart of the control of the electric current by use of the above upper limit of the electric current, and shows the simplest control.

In S11, the latest electric current upper limit calculated by the flow of FIG. 4 is read.

In S12, the actual current (the instantaneous value of the electric current) i is measured from the output of the ammeter 19 (FIG. 1), and it is determined whether or not the actual current i is in excess of the upper limit of the electric current (the actual current i>the upper limit).

When the actual current i≤(less than or equal to) the upper limit of the electric current, the step proceeds to S21, to raise a power generation current. On the other hand, when the actual current i>(greater than) the upper limit of the electric current, the step proceeds to S22 to lower the power generation current, thereby suppressing a voltage drop.

Figure 6:
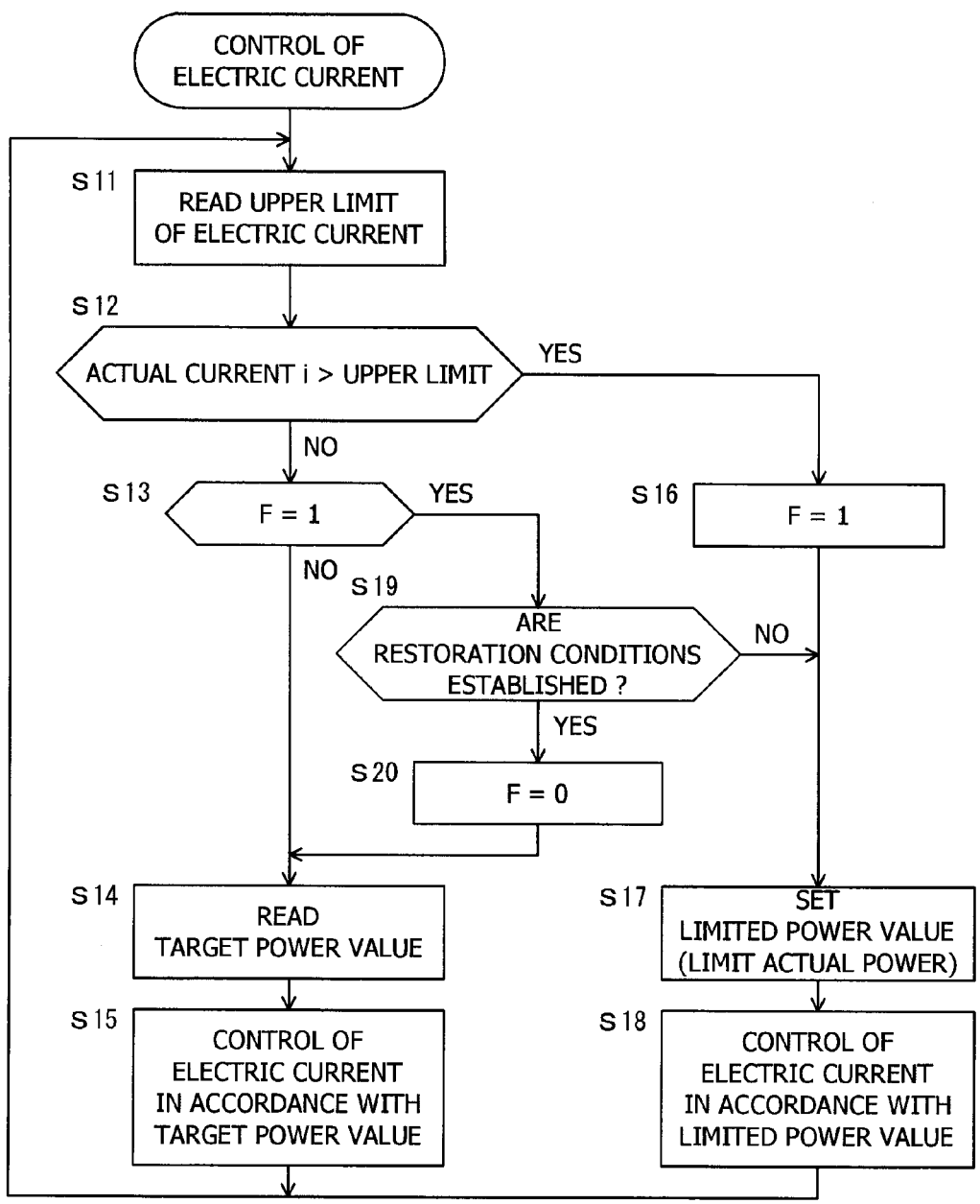
FIG. 6 is a flowchart of another example of an electric current control routine.

In the same manner as in FIG. 5, FIG. 6 is a flowchart of electric current control by use of the above upper limit of the electric current, and also indicates a relationship with the target power generation value and the like.

In S11, the latest electric current upper limit calculated by the flow of FIG. 4 is read.

In S12, the actual current (the instantaneous value of the electric current) i is measured from the output of the ammeter 19 (FIG. 1), and it is determined whether or not the actual current i exceeds the upper limit of the electric current (the actual current i>(greater than) the upper limit).

When the actual current i≤(less than or equal to) the upper limit of the electric current, the step proceeds to S13.

In S13, it is determined whether or not the actual current i>(greater than) the upper limit of the electric current set in the past is set to flag F=1 as it is, and in the case of NO, i.e., F=0, the step proceeds to S14 and S15 for control in a usual mode.

In S14, the target power generation value of the fuel cells is read. The target power generation value is set in accordance with the demanded power by a separate routine.

In S15, the electric current drawn from the fuel cells is set and controlled based on the target power generation value. Specifically, the target power generation value of the fuel cells is divided by the output voltage (the instantaneous value) of the fuel cells, to set a target electric current value, and the electric current drawn from the fuel cells is controlled in accordance with this target electric current value.

When the actual current i>(greater than) the upper limit in the determination of S12, the step proceeds to S16 to set the flag F=1, and then the step proceeds to S17 and S18 for control in a limiting mode.

In S17, a limited power value is set, and the actual power is limited. Therefore, at this time, the amount of the fuel to be supplied to the fuel cells, the amount of the air to be supplied thereto or the like is decreased so as to suppress the generated power of the fuel cells to the limited power value.

In S18, the electric current drawn from the fuel cells is controlled based on the limited power value. Specifically, the limited power value of the fuel cells is divided by the output voltage (the instantaneous value) of the fuel cells, to set the target electric current value, and the electric current drawn from the fuel cells is controlled in accordance with this target electric current value.

When entering the limiting mode, the flag F=1 (S16). Therefore, afterward, even when the actual current i≤(less than or equal to) the upper limit in the determination of S12, the step proceeds S17 and step 18 to continue the limiting mode, as long as the determination of S13 results in YES and predetermined restoration conditions are not established in S19. Examples of the case in which the restoration conditions are not established may include a case in which a cell temperature is higher than an allowable upper limit, a case in which a fuel use ratio is higher than an allowable upper limit, and a case in which an air use ratio is higher than an allowable upper limit. When the predetermined restoration conditions are established in S19, F=0 is set in S20, and then the step proceeds to S14 and S15, thereby returning to the usual mode.

It is to be noted that in the embodiment of the present invention, the limited power value is set separately from a target power value in the limiting mode, but the target power value may be corrected to be decreased, and used.

Next, a difference in control between a conventional technology and the embodiment of the present invention will be described with reference to FIG. 7.

Figure 7A:
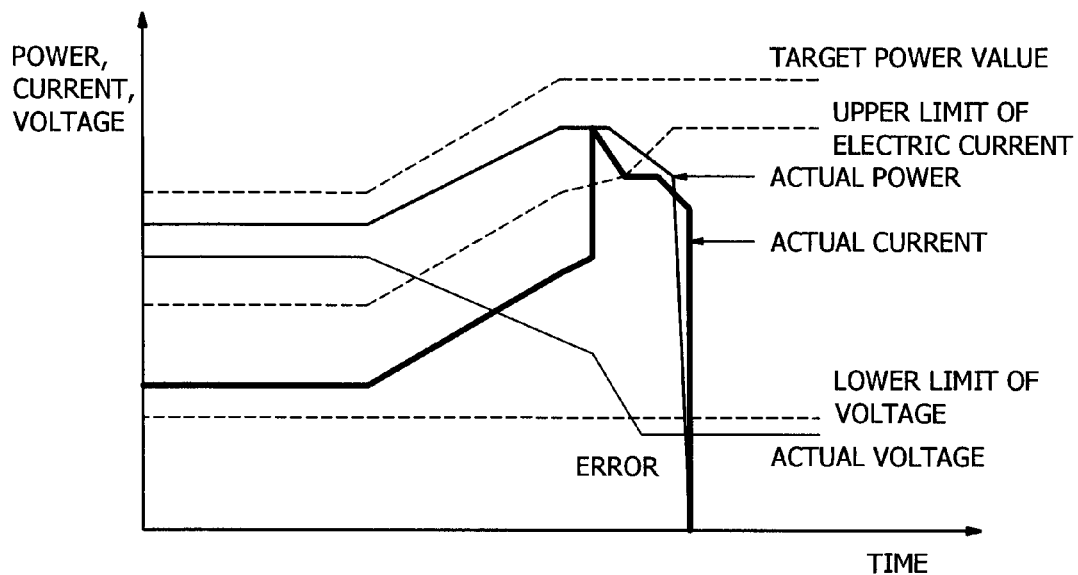
FIGS. 7A and 7B are time charts of electric current control in a conventional technology and the present embodiment.

FIG. 7A is the case of the conventional technology.

In the conventional technology, the electric current drawn from the fuel cells is controlled based on a target power generation value (the electric current=the target power value/the voltage). However, if the target power generation value suddenly increases and then the electric current drawn from the fuel cells suddenly increases, an output voltage of the fuel cells suddenly decreases in accordance with I-V characteristics, and is less than a lower limit of a voltage at which the fuel cells can stably generate power, leading to the suspension of an operation occasionally.

Therefore, the electric current drawn from the fuel cells is limited by setting an upper limit of the electric current, but conventionally, the upper limit of the electric current is set in accordance with the target power generation value, and when the electric current is momentarily close to the upper limit of the electric current, a voltage drops in excess of the lower limit of the voltage, failing to prevent an error leading to the suspension of the operation.

That is, when the target power value increases, the actual current increases and an actual voltage accordingly drops, the actual current is not able to be suppressed and the voltage drop is not able to be prevented, if the actual voltage rapidly lowers and the actual current rapidly rises for a certain reason. Therefore, the actual voltage is less than the lower limit of the voltage, and the error leading to the suspension of the operation occurs.

Figure 7B:
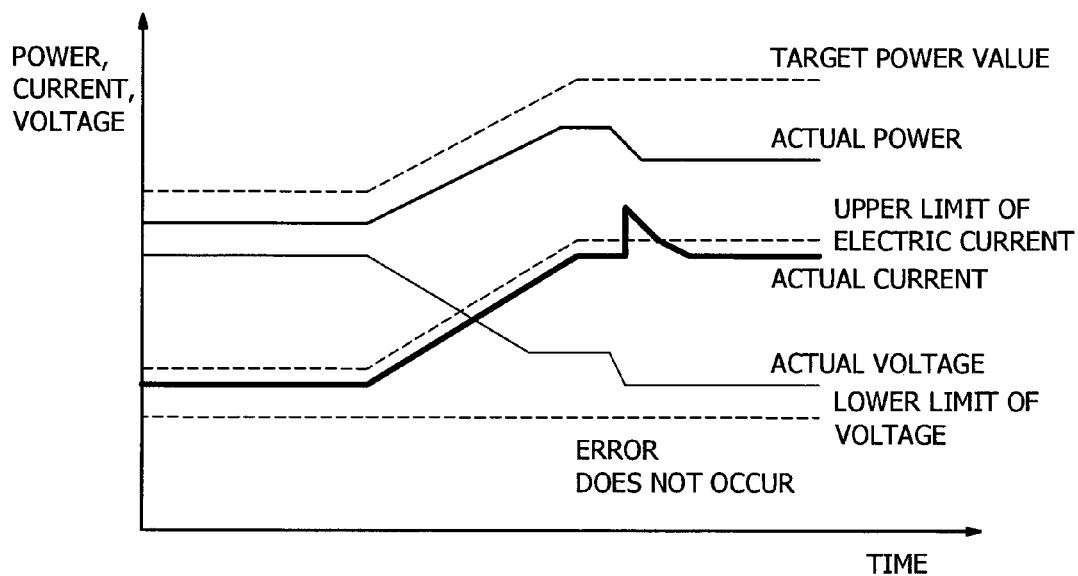

FIG. 7B is the case of the embodiment of the present invention.

According to the embodiment of the present invention, the upper limit of the electric current is set by adding the predetermined offset value to the average value of the actual current before a predetermined delay time.

Therefore, the target power generation value increases, the electric current drawn from the fuel cells increases, and the output voltage of the fuel cells drops in accordance with I-V characteristics. At this time, when the output voltage rapidly drops, the rise of the electric current can immediately be suppressed, even if the electric current further increases. Thus, the voltage drop can be suppressed.

Accordingly, it is possible to prevent the error that the actual voltage is less than the lower limit of the voltage, and leads to the suspension of the operation.

According to the embodiment of the present invention, the upper limit of the electric current is set by adding the predetermined offset value (e.g., 2 A) to the average value of the electric current before the predetermined delay time (e.g., 10 seconds), whereby a rapid fluctuation of the electric current can be suppressed, and the operation can stably be performed without excessively sensitively reacting with the rapid fluctuation in the system.

In particular, when the upper limit of the electric current is set based on the average value of the electric current, it is possible to avoid the fluctuation of the upper limit of the electric current due to the influence of the fluctuation of the instantaneous value of the electric current. That is, it is possible to avoid reactive unnecessary suppression of the electric current immediately after the electric current momentarily decreases. Therefore, the average value of the electric current is set so as to achieve averaging (smoothing) to such an extent that the influence of the instantaneous value of the electric current can be avoided.

Moreover, when the upper limit of the electric current is set based on the average value of the electric current before the predetermined delay time, the rapid rise of the electric current can be suppressed, whereas it is possible to cope with the comparatively gradual rise of the electric current without suppressing the rise. It is to be noted that when the predetermined delay time is excessively long, the electric current is unnecessarily suppressed even at a usual comparatively gradual load rise. Therefore, as such a value that the electric current is not suppressed at the comparatively gradual load rise, although depending on a device type, a delay time of, for example, 20 seconds is excessively long, and hence about 10 seconds may be set. That is, the delay time is set in consideration of a load rise speed and a delay time constant.

Moreover, the upper limit of the electric current is set by adding the predetermined offset value, whereby the upper limit is set higher than the actual current. Moreover, the upper limit can be controlled so as to regulate a follow-up speed to the higher side of the electric current. It is to be noted that when the predetermined offset value is excessively small, the electric current is unnecessarily suppressed even at the usual fluctuation of the electric current in a static state, and the rise speed of the electric current becomes excessively low. Therefore, as such a value that the electric current is not suppressed at the usual fluctuation of the electric current, although depending on the type of the device, for example, about 0.5 A is not set, but 1 A or greater may be set. Furthermore, as compared with a machine on which new fuel cells are mounted, in a machine on which deteriorated fuel cells are mounted, the usual fluctuation of the electric current becomes large, and hence the upper limit of the electric current may be set also in consideration of a degree of the deterioration of the fuel cells.

Thus, the upper limit of the electric current drawn from the fuel cells can optimally be set. With respect to the comparatively gradual change of the desired power value, the electric current is not excessively suppressed, because the load follow-up is disturbed, and with respect to the rapid change of the desired power value, the upper limit of the electric current is immediately updated to an optimal value, whereby the voltage drop caused by the rapid rise of the electric current can be prevented, and the suspension of the operation caused by voltage drop can be decreased as less frequently as possible.

Moreover, according to the embodiment of the present invention, the above average value of the electric current is the average value of the electric current of a plurality of points (e.g., four points) having a constant time interval (e.g., an interval of 0.5 second), whereby the influence of the fluctuation of the instantaneous value of the electric current can comparatively easily be avoided. However, the time interval and the number of the points are not restricted to those described in the embodiment of the present invention, and the average value may be an average value of two points or more.

Furthermore, according to the embodiment of the present invention, when the electric current drawn from the fuel cells is in excess of the upper limit of the electric current, the power generation current is controlled, whereby the voltage drop can securely be suppressed.

It is to be noted that in the above description, the fuel cell system including a hydrogen production device has been described; however the present invention can be applied also to a so-called pure hydrogen type fuel cell system in which a hydrogen cylinder or the like is used in place of the hydrogen production device.

Moreover, the above shown embodiment merely illustrates the present invention, and needless to say, the present invention includes various improvements and modifications made by a person skilled in the art within claims, in addition to the invention directly described in accordance with the embodiment.

It should be noted that the entire contents of Japanese Patent Application No. 2010-053936, filed on Mar. 11, 2010, on which the convention priority is claimed is incorporated herein by reference.

It should also be understood that many modifications and variations of the described embodiments of the invention will occur to a person having an ordinary skill in the art without departing from the spirit and scope of the present invention as claimed in the appended claims.

What is claimed is:

1. A fuel cell system comprising:
an electric current control means programmed to control an electric current drawn from fuel cells based on a target power generation value; in accordance with a demanded power;
an electric current limiting means for limiting the electric current by comparing the electric current with an upper limit of the electric current; and
an electric current upper limit setting means for setting the upper limit of the electric current by adding a predetermined offset value to an average value of the electric current before a predetermined delay time
wherein the electric current limiting means sets a limited power value with respect to the target power generation value to limit actual power, and controls the electric current drawn from the fuel cells based on the limited power value to thereby suppress voltage drop, when the actual current is in excess of the upper limit of the electric current.

2. The fuel cell system according to claim 1,
wherein the average value of the electric current is the average value of the electric current calculated based on electric current data of a plurality of points having a constant time interval.

3. An electric current control method of a fuel cell system,
wherein when controlling an electric current drawn from fuel cells based on a target power generation value, in accordance with demanded power, and limiting the electric current by comparing the electric current with an upper limit of the electric current,
the upper limit of the electric current is set by adding a predetermined offset value to an average value of the electric current calculated based on electric current data of a plurality of points having a constant time interval before a predetermined delay time.

4. The electric current control method of a fuel cell system according to claim 3
wherein, in a case in which the electric current is limited, when the electric current is in excess of the upper limit of the electric current, a limited power value is set with respect to the target power generation value to limit actual power, and the electric current drawn from the fuel cells us controlled based on the limited power value to thereby suppress voltage drop.

\* \* \* \* \*